(12) United States Patent
Ramle et al.

(10) Patent No.: US 11,229,074 B2
(45) Date of Patent: Jan. 18, 2022

(54) SERVICE REQUEST HANDLING

(71) Applicant: Telefonaktiebolaget LM Ericsson (publ), Stockholm (SE)

(72) Inventors: Peter Ramle, Mölnlycke (SE); Qian Chen, Mölndal (SE); Peter Hedman, Helsingborg (SE); Josefin Karlsson, Torslanda (SE); Lasse Olsson, Träslövsläge (SE); Stefan Rommer, Västra Frölunda (SE); Mikael Wass, Sätila (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 541 days.

(21) Appl. No.: 16/319,039

(22) PCT Filed: Jan. 9, 2018

(86) PCT No.: PCT/EP2018/050432
§ 371 (c)(1),
(2) Date: Jan. 18, 2019

(87) PCT Pub. No.: WO2018/127597
PCT Pub. Date: Jul. 12, 2018

(65) Prior Publication Data
US 2021/0337609 A1    Oct. 28, 2021

Related U.S. Application Data

(60) Provisional application No. 62/443,979, filed on Jan. 9, 2017.

(51) Int. Cl.
*H04W 8/08*     (2009.01)
*H04W 76/15*    (2018.01)
*H04W 76/25*    (2018.01)

(52) U.S. Cl.
CPC .......... *H04W 76/15* (2018.02); *H04W 76/25* (2018.02)

(58) Field of Classification Search
CPC ....... H04W 76/15; H04W 76/25; H04W 8/08; H04W 28/02
See application file for complete search history.

(56) References Cited

U.S. PATENT DOCUMENTS

2018/0192337 A1* 7/2018 Ryu .................. H04W 36/0066
2019/0246342 A1* 8/2019 Wang ..................... H04W 8/08
(Continued)

FOREIGN PATENT DOCUMENTS

WO    WO 2015/133955 A1    9/2015

OTHER PUBLICATIONS

Japanese Office Action for Japanese Patent Application No. 2019-531311 dated Aug. 31, 2020, 3 pages.
(Continued)

*Primary Examiner* — Andrew Wendell
(74) *Attorney, Agent, or Firm* — Sage Patent Group

(57) ABSTRACT

Embodiments here in relate to methods for message handling performed by an Access and Mobility Management function, AMF, and a User Equipment, UE, as well as a corresponding AMF and UE. Particularly, embodiments herein relate to methods for handling service requests performed by an Access and Mobility Management function, AMF, and a User Equipment, UE, as well as a corresponding AMF and UE.

14 Claims, 14 Drawing Sheets

(56) References Cited

U.S. PATENT DOCUMENTS

2019/0364475 A1* 11/2019 Chandramouli ...... H04W 80/10
2019/0387393 A1* 12/2019 Xu .................... H04W 36/0016
2020/0053531 A1* 2/2020 Myhre ................. H04W 48/18
2020/0068481 A1* 2/2020 Kim ..................... H04W 48/16
2020/0187277 A1* 6/2020 Lee ..................... H04W 80/10

OTHER PUBLICATIONS

International Search Report and Written Opinion of the International Searching Authority, PCT/EP2018/050432, dated Mar. 21, 2018, 11 pages.

"Updated Interim Agreements on K1 4," SA WG2 Meeting #S2-118 (S2-166724) Nov. 14-18, 2016, Reno, NV, USA, NEC, Agenda Item 6.10.4, NextGen/Rel14 (XP051185274) 5 pages.

"Technical Specification Group Services and System Aspects; Study on Architecture for Next Generation System," (Release 14) 3GPP TR 23.799 V1.1.0 (Oct. 2016) (XP051173181) 501 pages.

"Technical Specification Group Services and System Aspects; Study on Architecture for Next Generation System," (Release 14) 3GPP TR 23.799 V1.1.0 (Oct. 2016)—Marked-up Version— (XP051173181) 534 pages.

* cited by examiner

SERVICE REQUEST HANDLING

CROSS REFERENCE TO RELATED APPLICATIONS

This application is a 35 U.S.C. § 371 national stage application of PCT International Application No. PCT/EP2018/050432 filed on Jan. 9, 2018, which in turns claims domestic priority to U.S. Provisional Patent Application No. 62/443,979, filed on Jan. 9, 2017, the disclosures and content of which are incorporated by reference herein in their entirety.

TECHNICAL FIELD

Disclosed are embodiments for handling service requests.

BACKGROUND

The Third Generation Partnership Project (3GPP) has begun on work on the development and design of the next generation mobile communications system (a.k.a., the 5G mobile communication system or the Next Generation (NG) system or simply "5G" or "NG" for short). In the 3GPP NexGen study phase it is concluded that the Mobility Management (MM) function and the Session Management (SM) function (SMF) shall be separated. See, e.g., 3GPP TR 23.799 v14.0.0 (2016-12). The MM function (MMF) is also known as the Access and Mobility Management function (AMF), accordingly the AMF and the MMF are equivalent.

SUMMARY

Due to the separation of the AMF and SMF and the single NAS termination in the AMF in 5G, the 5G Service Request (SR) procedure handling is different than the 3G and 4G SR procedure handling. This disclosure addresses the following issues with respect to the 5G SR procedure handling: (1) user plane (UP) setup latency; (2) efficient NAS signaling for total PDU session synchronization between user equipment (UE) and network; and (3) utilization of common logic for Mobile Terminated (MT) traffic and Mobile Originated (MO) traffic handling.

The UP setup latency in the SR procedure can be improved because it is not necessary to bundle the UP setup for all PDU sessions in one SR procedure.

For example, in one embodiment, when a User Equipment (UE) (i.e., a device capable of wireless communication, such as, for example, a smartphone, a tablet, a personal computer, a utility meter, a sensor, a vending machine, etc.) initiates a NAS SR indicating a set of one or more PDU sessions needed for UP re-established (i.e., a set of one or more PDU sessions that require UP resources, such as, for example, data radio bearers and related UP tunnels) and requesting individual answers (e.g. UP setup from network) per PDU session, each implicated SMF handles UP setup (or failure handling of UP setup) individually for each PDU session and the AMF shall only wait for the first PDU UP setup before continuing the NG2 setup, the other PDU sessions are handled asynchronously toward NG2 (and NG1) by the AMF. In another embodiment, the AMF concatenates several PDU sessions for UP setup based on a time budget, e.g. AMF may optionally collect the SMF responses for the different PDU sessions and use one response back to the UE/Radio Access Network (RAN) within a time period determined by the time budget.

For the "total PDU session" status synch between the UE and network (i.e. synch the UE view of PDU sessions previously established with the network view of the previously established PDU sessions), a NAS logic is introduced and used only when total PDU session status is not synchronized (i.e. when the UE view is different than the network view).

Additionally, in some embodiments, when the UE initiates an SR procedure in response to paging that was triggered due to MT traffic, the UE indicates the corresponding PDU session(s) for which UP resources are needed (in addition to indicating the corresponding PDU session the UE may indicate another PDU session for which the UE has uplink data to send to the network). Accordingly, in one embodiment, the AMF includes the corresponding PDU session ID (e.g., a simplified representation) in NG2 Paging Request, and the UE shall use this information to indicate in an SR message the PDU sessions requested for UP re-establishment for MT traffic (as noted above, the SR message may further include information indicating other PDU sessions as well—e.g., PDU sessions for which the UE has uplink data to send).

In other embodiments, when the UE initiates an SR procedure in response to a page that was triggered due to MT traffic, the UE does not indicate the corresponding PDU session(s) for which UP is needed. Rather, the AMF, based on information that it stored when it received the data notification from the SMF that triggered the page, obtains the PDU session ID and transmits to the SMF that sent the notification an NG11 SM notification request.

Advantages provided by embodiments disclosed herein include: (1) UP setup latency for different PDU sessions is decoupled, which is beneficial for the individual service latency, and enables also network slice isolation; (2) an efficient PDU session status synchronization between UE and network (in current 3G, Service accept is always needed in PMM-Connected mode and in 4G no Service Accept and always using lower layer as response); and (3) enabling of efficient service re-activation where both UE and network needs are catered for in a common way.

BRIEF DESCRIPTION OF THE DRAWINGS

The accompanying drawings, which are incorporated herein and form part of the specification, illustrate various embodiments.

DETAILED DESCRIPTION

Figure 1:
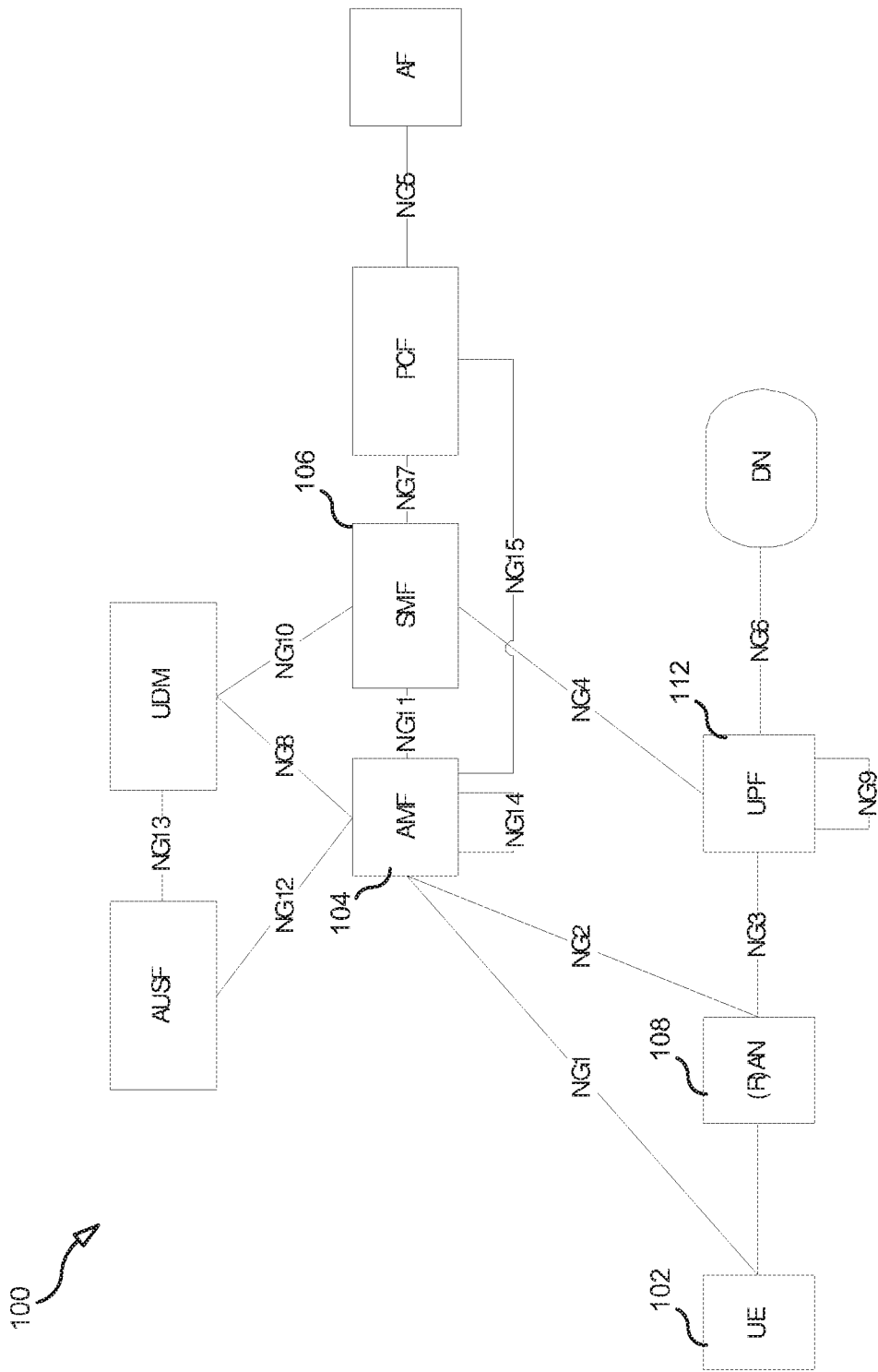
FIG. 1 illustrates an exemplary Next Generation communication structure.

As mentioned above, the AMF and SMF are separated in the 5G core network. Referring now to FIG. 1, FIG. 1 illustrates an exemplary 5G communication system 100. The 5G communication system 100 illustrates a point to point reference point representation.

As shown in FIG. 1, a single NG1 interface is used for both MM and SM-related messages and procedures for a UE 102. The single NG1 termination point is located in the AMF 104.

The AMF 104 and SMF 106 are separate NFs (Network Function), with a standard NG11 interface specified in-between. AMF 104 handles the mobility management part of NAS signalling exchanged with UE 102, and the SMF 106 handles the session management part of NAS signalling exchanged with UE 102.

UE 102 may have multiple established PDU sessions and may be served by different instances of SMF 106. The AMF 104 selects the SMF functions for the PDU sessions. AMF may select different SMF functions for different PDU sessions.

AMF forwards session management (SM) related NAS information to the SMF.

Upon successful PDU session establishment, AMF stores the identification of serving SMFs of UE (e.g., for each established PDU session, the AMF stores information for linking a PDU session ID that identifies the PDU session with an SMF ID that identifies the SMF handling the identified PDU session—e.g., the AMF may store a record having a first field that stores the PDU session ID and a second field that stores the SMF ID), and SMF stores the identification of serving AMF of UE. The AMF is not expected to maintain any additional session context information. The AMF is not required to be aware of the content of SM NAS messages.

In case of UE having multiple established PDU sessions using multiple user plane (UP) functions (UPFs), the 5G system supports the independent activation of UE-CN UP connection per PDU session. The following MM and SM interactions are envisaged: (1) during transition from IDLE to CONNECTED state, for MT data transmission the "Impacts of MM events" procedure is used, and for MO data transmission the UE indicates during the Service Request procedure the PDU session(s) for which the UE-CN UP connection has to be activated; (2) when UE is in CONNECTED state, during mobility procedures (e.g. handover) within a AMF updates only the SMFs for which the UE has active UE-CN UP connection(s); and (3) during CONNECTED state, if the UE has activated UE-CN UP connection for a subset of active PDU sessions, NG system supports the activation of additional UE-CN UP connection for further PDU sessions.

Some NG2 signalling (such as Hand-Over related signalling) may require the action of both AMF and SMF. In such case, the AMF is responsible to ensure the coordination between AMF and SMF. This may correspond to following procedures: (A) NG2 impacts of SM events and (B) Impacts of MM events.

NG2 impacts of SM events procedure includes: (1) At the set-up/modification/release of a PDU session and UE-CN UP connection activation/deactivation: the SMF interacts with RAN via the AMF for setup, modification and release of radio and NG3 resources for the PDU session; and (2) At the set-up/modification of QoS for GBR flows or modification of QoS rules for non-GBR flows, the SMF interacts with the RAN via the AMF to provide the QoS information.

Impacts of MM events procedure includes: (1) at the transition from IDLE to CONNECTED: the SMF, for which the UE-CN UP connection(s) is to be activated, interacts with RAN via the AMF for setting up of radio and NG3 resources for the PDU session.

As mentioned above, due to the separation of the AMF and SMF, and the single NAS termination in the AMF in 5G, the Service Request (SR) procedure handling is handled differently from 3G and 4G. According to the different 5G SR procedure the following issues are addressed: (1) UP setup latency in the SR procedure; (2) efficient NAS signaling for total PDU session synchronization between user equipment (UE) and network; and (3) utilization of common logic in the SR procedure for Mobile Terminated (MT) traffic and Mobile Originated (MO) traffic handling.

Figure 2:
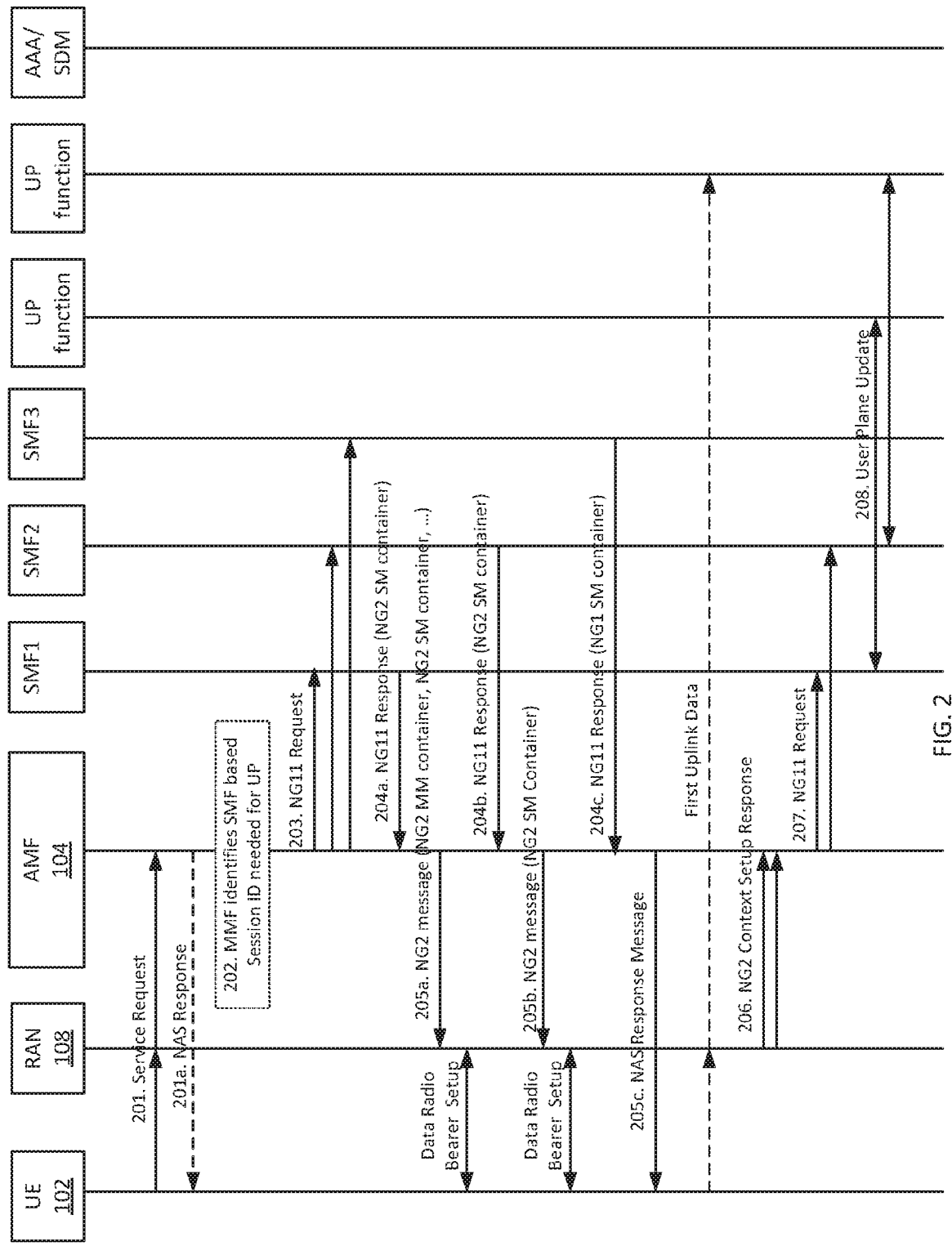
FIG. 2 is a message flow diagram illustrating a process according to one embodiment.

FIG. 2 is a flow chart illustrating a process, according to one embodiment, for establishing (e.g., re-establishing) a UP (i.e., setting up UP resources) for enabling the UE to send uplink data to a UP function (UPF).

When the UE has data to send to the UPF, the UE transmits a service request (SR) (e.g., an NG1 Service Request) comprising information (e.g., a first parameter) indicating the UE's PDU sessions that require UP establishment (step 201). For example, the SR may include a first ordered set of N bits (i.e., a "bitmap"), where each one of the N bits corresponds to a different one of N possible PDU sessions that could require UP establishment (e.g., the first bit in the string corresponds to a first PDU session, the second bit in the string corresponds to a second PDU session, etc.). In some embodiments, N is equal to the total number of PDU sessions that are deemed active by the UE (e.g., N=3), whereas in other embodiments N is equal to the total number of possible active PDU sessions in the UE (e.g., N=16). The value of each bit in the bit string indicates whether the PDU session corresponding to the bit requires UP establishment (e.g. if bit n is set to a value of 1, then the PDU session #n is requires UP establishment, but if the bit n is set to a value of 0, then the PDU session #n does not require UP establishment). In this way, the UE can signal to the network the UP status of each active PDU session for the UE.

Upon receiving the SR, the AMF examines the information (e.g., the bitmap) included in the SR to determine the PDU sessions for which UP resources are to be established and further examines stored information that maps PDU sessions to SMFs to determine, for each PDU session for which the UP is to be established, the SMF that is handling the PDU session (it is possible that a single SMF is handling multiple PDU sessions for the UE). After identifying the SMFs that are handling the PDU sessions for which UP is to be established, the AMF transmits to each one of the identified SMFs an NG11 message (a notification or request) (step 203).

In some embodiments, the SR transmitted by the UE further includes PDU session status information (e.g., a second parameter) that identifies, for each possible PDU session, the status of the PDU session (e.g., active or inactive). For example, the SR may include a second bitmap of N bits, where each one of the N bits corresponds to a different one of N possible PDU sessions (e.g., the first bit in the string corresponds to PDU session #1, the second bit in the string corresponds to PDU session #2, etc.). The value of each bit in the bit string indicates the status of the PDU session corresponding to the bit (e.g. if bit n is set to a value of 1, then the PDU session #n is active but if the bit n is set to a value of 0, then the PDU session #n is inactive). In this way, the UE can signal to the network the status of each possible PDU session for the UE.

In one embodiment, upon receipt of the SR, the AMF checks for any differences between the PDU session status information included in the SR (e.g., indicated by the second bitmap) and PDU sessions status information previously stored by the AMF. For example, the AMF itself may store for each UE that it serves a bitmap containing information regarding the status of the UE's PDU sessions. In step 201a, the AMF may send an NG1 response (e.g., an NAS response) to the UE to synchronize the PDU session status information if there are unsynchronized PDU sessions (i.e., if the PDU session status information included in the SR does not match the PDU session status information maintained by the AMF). That is, step 201a may be performed if there is a mismatch between the PDU session status indicated in the SR sent by the UE and the PDU session status information for the UE that is maintained by the AMF, which mismatch implies the need for synchronization. As a specific example, if the UE sends an SR containing the bitmap "0000 0000 0011 0000," this means that the UE has indicated to the network that PDU sessions 5 and 6 are active. If the PDU session status information for the UE that is maintained by AMF also indicates that PDU sessions 5 and 6 are active, then it's fine. If, however, the PDU session status information for the UE that is maintained by AMF indicates only that PDU session 5 is active, then the AMF can indicate back to UE with a bitmap of 0000 0000 0001 0000. This will indicate to the UE that the UE should inactive PDU session 6.

In an embodiment, the UE may start a timer to monitor the response(s) from the RAN.

In response to the NG11 messages, each SMF responds to AMF individually with an NG11 response (steps 204a-c). The NG11 responses include an NG2 SM container (i.e., a block of information) which may include core network (CN) UP tunnel information and quality of service (QoS) information for the PDU session. The NG11 responses can be successful or unsuccessful.

In step 205a, upon receipt of the first NG11 response from an SMF (e.g., SMF1) (step 204a) the AMF generates an NG2 MM container comprising, among other information, information regarding AS security, and transmits the NG2 MM container along with the received NG2 SM container to the RAN without waiting for responses from the other SMFs. For example, in step 204a, without waiting for any other responses from the other SMFs to which the AMF sent the NG11 notification, the AMF transmits to the RAN an NG2 message (e.g., context setup) that comprises the NG2 SM container and the NG2 MM container.

In an embodiment, NG2 MM container comprises an NG1 response (e.g., the NAS response) when there is the above described PDU session state information mismatch has been detected by the AMF.

In steps 205b-c, the NG11 responses from SMF2 and SMF3 (see steps 204b and 204c) are transmitted by the AMF to the RAN and UE, respectively. That is, in step 205b, the AMF transmits to the RAN an NG2 message comprising the NG2 SM container received from SMF2 in step 204b, and in step 205c, the AMF transmits to the UE a NAS message in response to receiving the NG11 response in step 204c. In this example, the AMF transmits to the UE a NAS message in response to receiving the NG11 response in step 204c because the NG11 response received in step 204c indicates that the SMF3 lost the PDU session and missed a synchronization with the AMF (i.e., the SMF3 may respond directly to the UE with a NG1 Response (e.g., NAS Response)).

In some embodiments, rather than send to the RAN the NG2 message (e.g., context setup) immediately after receiving the first NG11 response (i.e., without waiting for any responses from the other SMFs to which the AMF sent the NG11 notification), the AMF, based on a time budget, may include several NG2 SM containers in one NG2 message. The time budget can be based on a predetermined configuration or policy. In an embodiment, the time budget can be based on the learning of the criticality of the application and/or service in the PDU session. For instance, the AMF may activate a timer to expire after X seconds (X is the time budget) and when the timer expires the AMF may transmit to the RAN the NG2 message, which NG2 message will contain the NG2 MM container and each one of the NG2 SM containers received by the AMF prior to the expiration of the timer. The AMF may activate the timer immediately after transmitting the first NG11 notification or it may activate the timer immediately after receiving the first NG11 response.

In step 206, the RAN transmits an NG2 context setup response to setup the UPs for each PDU session individually. The NG2 context setup response comprises the NG2 SM container and information regarding the access network (AN) UP tunnel. In an embodiment, the UE takes further actions based on the response time measured by the timer to monitor the response(s) from the RAN. In cases where the AMF includes two or more NG2 SM containers (e.g., from different SMFs) in the NG2 message sent to the RAN, the RAN may send only one NG2 response that includes a corresponding two or more NG2 containers (at NG2 and N11 interface, if the requesting node sends several items in one request, the receiving node shall respond with several corresponding items in one response), and, for each NG2 container included in the NG2 response, the AMF transmits the NG2 container to the appropriate SMF.

In step 207, the AMF forwards the NG2 context setup responses, which includes the radio access network through an NG11 request to the appropriate SMFs.

Figure 3:
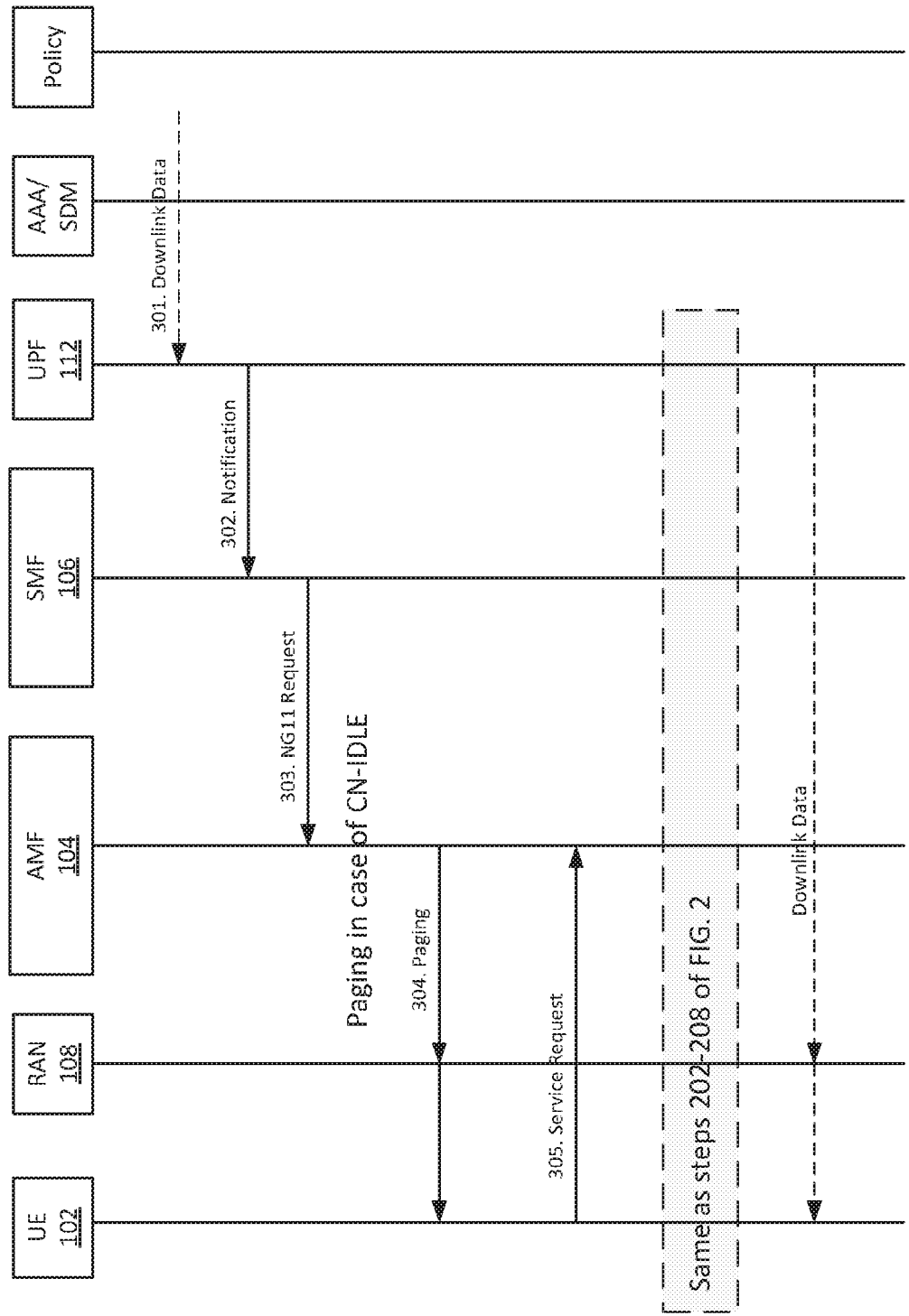
FIG. 3 is a message flow diagram illustrating a process according to one embodiment.

FIG. 3 is a message flow diagram illustrating a process, according to some embodiments, to re-establish UP from UE to the network for the MT data triggered paging and service request.

In step 301, UPF 112 receives downlink (DL) UP data for UE 102.

In step 302, UPF 112 sends to SMF 106 a DL UP data notification message to notify SMF 106 that UPF 112 has received DL UP data for UE 102.

In step 303, SMF 106 sends to AMF 104 a UP setup request.

In step 304, determines whether the UE is in the CN-IDLE mode and, if so, the AMF triggers a paging of the UE (i.e., triggers the sending of a paging message to the UE). In one embodiment, AMF 104 includes in the paging message sent to the UE PDU session identification information for identifying the PDU session for which the UP is being established (i.e., information for identifying which PDU session has MT data). In some embodiments, the AMF determines the PDU session identification information based on the SMF from which the AMF received the UP setup request. For example, in some embodiments, the AMF may store context information for UEs that it serves, which context information may include information mapping a PDU session identifier to an SMF identifier.

In step 305, in response to receiving the paging message, the UE performs an SR procedure (transmits an SR to the AMF). The SR, as discussed above, may include information (e.g., the above described second bitmap) that identifies, for each possible PDU session, the status of the PDU session. Additionally, if the AMF included in the paging message PDU session identification information identifying one or more PDU sessions having DL UP data for the UE, then the UE may further include in the SR PDU session identification information for identifying the PDU session(s) identified in the paging message (e.g., the PDU session identification information may be the above described first bitmap). Moreover, if the UE has uplink (UL) UP traffic on other PDU sessions at the same time the UE received the paging message, then the UE may also include in the SR information indicating that these other PDU sessions need UP establishment (e.g., if the UE as UL UP data on PDU session #3, then the UE may set to a value of 1 the bit in the first bitmap that corresponds to PDU session #3).

The rest of the procedure is similar to the UE triggered service request flow, as illustrated in FIG. 2.

In another embodiment, the AMF does not include the PDU session identification information in the paging message sent to the UE. Rather, the AMF may correlate the SMF/PDU sessions when an SR is received from UE based on the UE identifier.

For example, when the AMF receives from the SMF a request indicating a PDU session (e.g. PDU Session #1) for a particular UE and further indicating an SMF ID (e.g., SMF-ID 1), the AMF may store in a database (e.g., a file) a record having a first field that contains a UE identifier for identifying the particular UE, a second field storing information identifying the PDU session, and a third field storing the SMF ID. Thus, when the AMF receives the SR from the UE, which SR includes the UE's ID, the AMF can use the UE's ID to retrieve the record from the database and then obtain the PDU session ID and SMF ID from the record. Once the AMF has obtained the PDU session ID and SMF ID from the record, the AMF can now send to the SMF identified by the SMF ID an NG11 message (e.g., a notification comprising the PDU session ID). If the database includes more than one record with the same UE ID in the UE ID field, then the AMF can send an appropriate NG11 message to each one of the identified SMFs.

Figure 4:
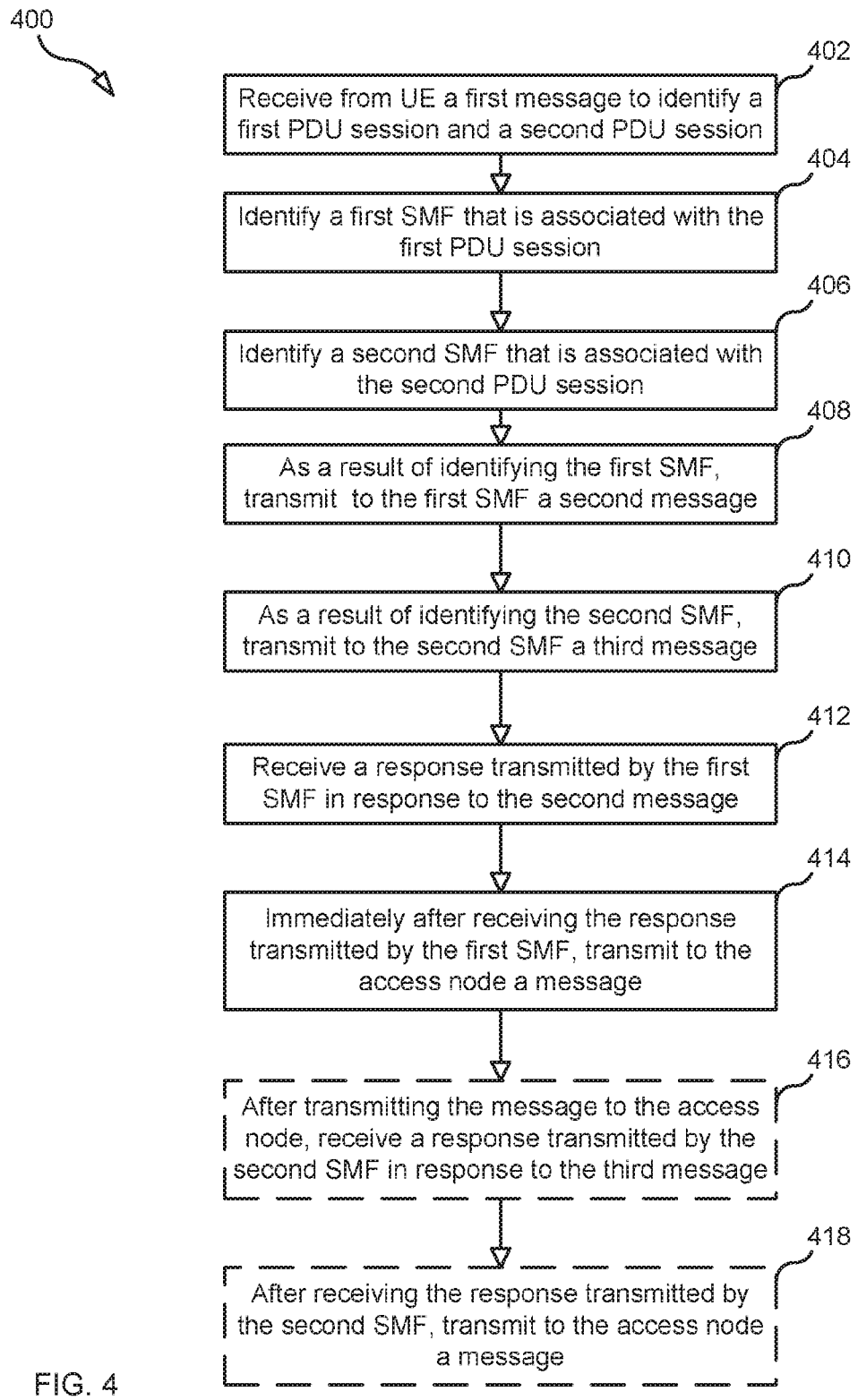
FIG. 4 is a flow chart illustrating a process according to one embodiment.

FIG. 4 is a flow chart illustrating a process 400, according to one embodiment, that is performed by the AMF for message handling (e.g., service request handling).

Process 400 may begin with step 402 in which the AMF receives a first message (e.g., a service request) transmitted by the UE, wherein the first message comprises information (e.g., a first bitmap) identifying: i) a first PDU session for which a UP is to be established and ii) a second PDU session for which a UP is to be established.

In step 404, the AMF identifies a first SMF that is associated with the first PDU session.

In step 406, the AMF identifies a second SMF that is associated with the second PDU session.

In step 408, as a result of identifying the first SMF, the AMF transmits to the first SMF a second message (e.g., an NG11 notification/request).

In step 410, as a result of identifying the second SMF, the AMF transmits to the second SMF a third message (e.g., an NG11 notification/request).

In step 412, the AMF receives a response transmitted by the first SMF in response to the second message, wherein the response transmitted by the first SMF comprises a first session management (SM) container (i.e., a set of SM information) for an access node (108) serving the UE.

In step 414, immediately after receiving the response transmitted by the first SMF (i.e., without waiting for any response from the second SMF), the AMF transmits to the access node a message. The message comprises a) a mobility management (MM) container and b) the first SM container received from the first SMF.

In some embodiment, after transmitting to the access node the message comprising a) the mobility management (MM) container and b) the first SM container received from the first SMF, the AMF receives a response transmitted by the access node. The response transmitted by the access node comprises radio access network (RAN) UP information for the first SMF. Upon receipt of the response transmitted by the access node, the AMF forwards the RAN UP information to the first SMF. The RAN UP information enables the first SMF to communicate the RAN UP information to a UP function (UPF) for the first PDU session.

In some embodiment, the first SM container comprises information indicating a first core network (CN) UP tunnel and a first quality of service (QoS).

In some embodiments, process 400 further includes steps 416 and 418.

In step 416, after transmitting the message to the access node, the AMF receives a response transmitted by the second SMF in response to the third message. The response transmitted by the second SMF comprises a second SM container for the access node serving the UE.

In step 418, after receiving the response transmitted by the second SMF, the AMF transmits to the access node a message comprising the second SM container received from the second SMF.

In some embodiment, after transmitting to the access node the message comprising the second SM container received from the second SMF, the AMF receives a response transmitted by the access node. The response transmitted by the access node comprises radio access network (RAN) UP information for the second SMF. Upon receipt of the response transmitted by the access node, the AMF forwards the RAN UP information to the second SMF. The RAN UP information enables the second SMF to communicate the RAN UP information to a UP function (UPF) for the second PDU session.

In some embodiment, the second SM container comprises information indicating a second CN UP tunnel and a second QoS.

Figure 5:
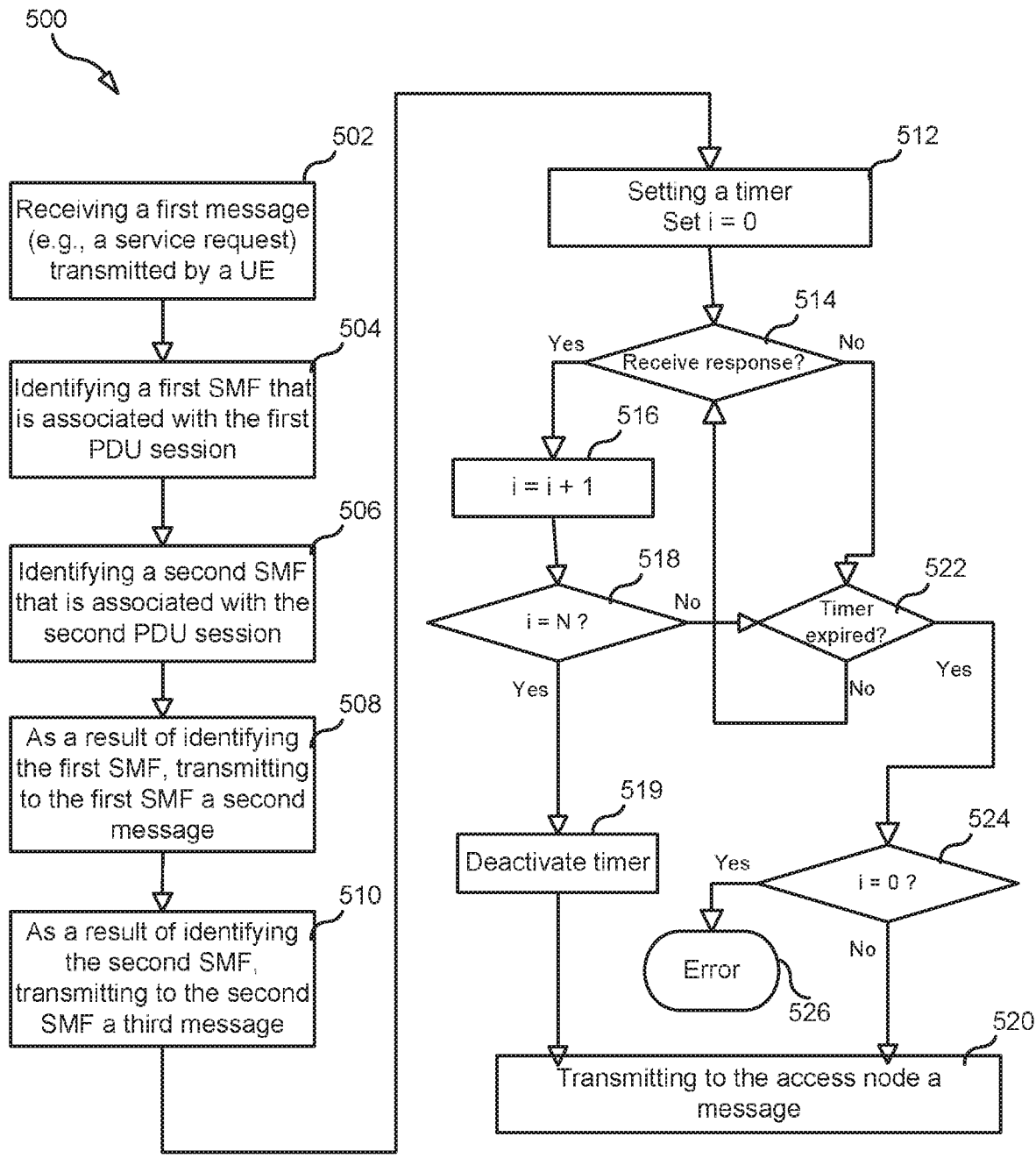
FIG. 5 is a flow chart illustrating a process according to one embodiment.

FIG. 5 is a flow chart illustrating a process 500, according to one embodiment, that is performed by the AMF for message handling (e.g., service request handling).

Process 500 may begin with step 502 in which the AMF receives a first message (e.g., a service request) transmitted by the UE, wherein the first message comprises information (e.g., a first bitmap) identifying: i) a first PDU session for which a UP is to be established and ii) a second PDU session for which a UP is to be established.

In step 504, the AMF identifies a first session managing function (SMF) that is associated with the first PDU session.

In step 506, the AMF identifies a second SMF that is associated with the second PDU session.

In step 508, as a result of identifying the first SMF, the AMF transmits to the first SMF a second message (e.g., an NG11 notification/request).

In step 510, as a result of identifying the second SMF, the AMF transmits to the second SMF a third message (e.g., an NG11 notification/request).

In step 512, the AMF sets a timer. The AMF may also initialize a counter (e.g., set i=0) for keeping track of the number of SMF responses the AMF receives. In an embodiment, the timer is set based on predetermined configurations and policies. In another embodiment, the timer is set based on a level of criticality of application and service in the first PDU session and the second PDU session.

In step 514, the AMF determines whether it has received a response to one of the messages transmitted in steps 508 and 510. If no response has been received, the process 500 proceeds to step 522, otherwise when a response is received the process 500 proceeds to step 516.

In step 516, which is reached when the AMF receives a response to one of the messages sent in steps 508 and 510, the AMF increments the counter (e.g., calculates i=i+1). The received response (e.g. a response transmitted by the first or second SMF) comprises a session management (SM) container for an access node serving the UE.

In step 518, the AMF determines whether i equals a variable N, wherein N indicates the number of SMFs from which a response can be received. If i=N, the process 500 proceeds to step 519 (i.e., all expected responses have been received), otherwise the process 500 proceeds to step 522.

In this embodiment, N=2 because a response can be received from the first and the second SMFs. In another embodiment, N can be any number in accordance with the number of SMFs a response can be received from.

In step 519, the AMF deactivates the timer.

In step 522, the AMF determines whether the timer has expired. If the timer has not expired, the process 500 returns to step 514, otherwise the process 500 proceeds to step 524.

In step 524, the AMF determines whether i=0. If i=0, the process 500 proceeds to step 526, otherwise the process 500 proceeds to step 520.

In step 526, the AMF indicates an error.

In step 520, the AMF transmits to the access node a message. The message transmitted in step 520 includes, for each SMF response received by this point in time, the SM container included in the response. For example, it is possible that the AMF receives only one SMF response (e.g., a response transmitted by the first SMF). In such a scenario, the AMF transmits to the access node a message comprising a) a mobility management (MM) container and b) the SM container received from the first SMF. As another example, it is possible that, before the time expires, the AMF receives a first response transmitted by the first SMF and also receives a second response transmitted by the second SMF, where the first response comprises a first SM container and the second response comprises a second SM container. In such a scenario, in step 520 the message transmitted by the AMF to the access node will include: a) a mobility management (MM) container, b) the first SM container received from the first SMF, and c) the second SM container received from the second SMF.

In some embodiments of method 400 and/or 500, the first message further comprises PDU session status information (e.g., a second bitmap) that identifies, for each possible PDU session, the status of the PDU session. In such embodiment, the method may further include: retrieving previously stored PDU session status information for the UE; determining whether the PDU session status formation contained in the first message matches the retrieved PDU status information for the UE; and in response to determining that the PDU session status formation contained in the first message does not match the retrieved PDU status information for the UE, transmitting to the UE a PDU session status synchronization message (e.g., an NG1 message) to synchronize the PDU session status information.

Figure 6:
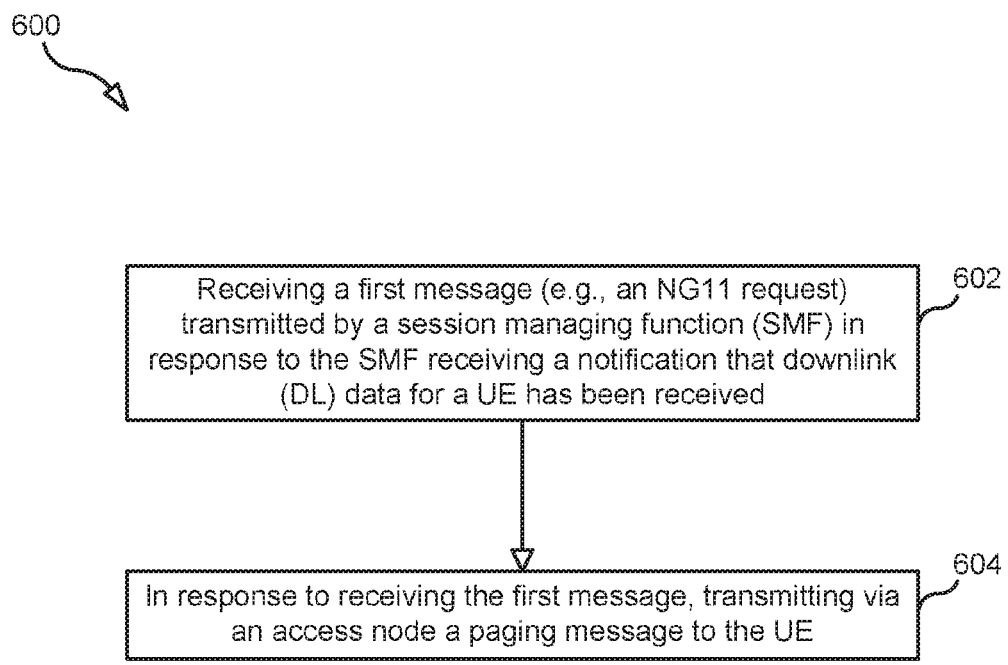
FIG. 6 is a flow chart illustrating a process according to one embodiment.

FIG. 6 is a flow chart illustrating a process 600, according to one embodiment, that is performed by the AMF for message handling (e.g., service request handling).

The process 600 may begin with step 602, in which the AMF receives a first message (e.g., an NG11 request) transmitted by a session managing function (SMF) in response to the SMF receiving a notification that downlink (DL) data for a user equipment (UE) has been received. The UE has at least one PDU session, the DL data is associated with a particular one of the UE's PDU sessions, and the first message comprises information indicating a request to setup a UP.

In step 604, in response to receiving the first message, the AMF transmits via an access node a paging message to the UE, wherein the paging message comprises information indicating said particular one of the UE's PDU sessions.

Figure 7:
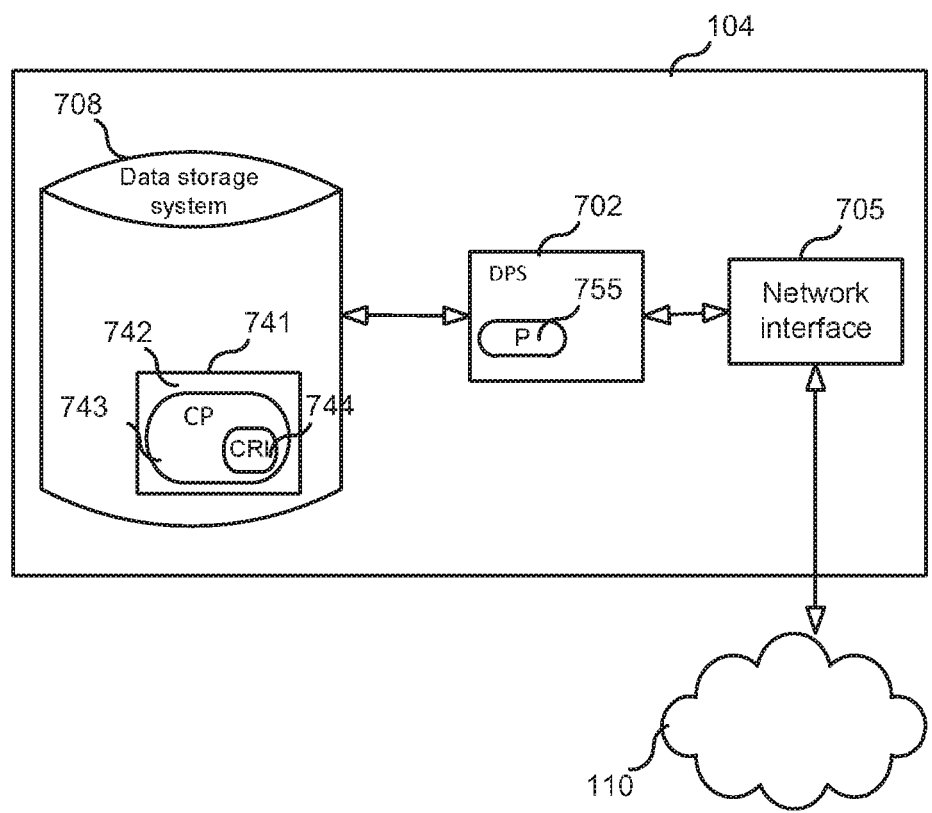
FIG. 7 is a block diagram of an AMF according to some embodiments.

FIG. 7 is a block diagram of AMF 104 according to some embodiments. As shown in FIG. 7, the AMF 104 may comprise: a data processing system (DPS) 702, which may include one or more processors 755 (e.g., a general purpose microprocessor and/or one or more other processors, such as an application specific integrated circuit (ASIC), field-programmable gate arrays (FPGAs), and the like); network interface 705 for use in connecting AMF to a network such that AMF 102 can communicate with the other described functions (e.g., SMF) and RAN 108; and local storage unit (a.k.a., "data storage system") 712, which may include one or more non-volatile storage devices and/or one or more volatile storage devices (e.g., random access memory (RAM)). In embodiments where the AMF 104 includes a general purpose microprocessor, a computer program product (CPP) 741 may be provided. CPP 741 includes a computer readable medium (CRM) 742 storing a computer program (CP) 743 comprising computer readable instructions (CRI) 744. CRM 742 may be a non-transitory computer readable medium, such as, but not limited to, magnetic media (e.g., a hard disk), optical media (e.g., a DVD), memory devices (e.g., random access memory), and the like. In some embodiments, the CRI 744 of computer program 743 is configured such that when executed by data processing system 702, the CRI causes the AMF to perform steps described above (e.g., steps described above with reference to the flow charts). In other embodiments, the AMF may be configured to perform steps described herein without the need for code. That is, for example, data processing system 702 may consist merely of one or more ASICs. Hence, the features of the embodiments described herein may be implemented in hardware and/or software.

Figure 8:
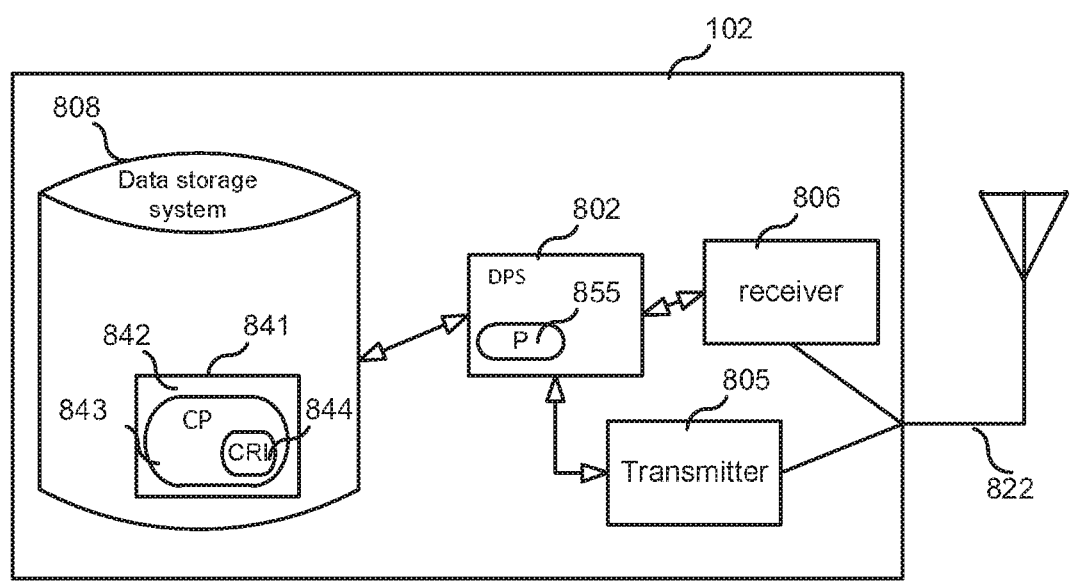
FIG. 8 is a block diagram of a UE according to some embodiments.

FIG. 8 is a block diagram of a UE 102 according to some embodiments. As shown in FIG. 8, UE 102 may comprise: a data processing system (DPS) 802, which may include one or more processors 855 (e.g., a general purpose microprocessor and/or one or more other processors, such as an application specific integrated circuit (ASIC), field-programmable gate arrays (FPGAs), and the like); a radio transmitter 805 and a radio receiver 806 coupled to an antenna 822 for use in wirelessly communicating with a radio access network (RAN) node (e.g., a TRP); and local storage unit (a.k.a., "data storage system") 812, which may include one or more non-volatile storage devices and/or one or more volatile storage devices (e.g., random access memory (RAM)). In embodiments where UE 102 includes a general purpose microprocessor, a computer program product (CPP) 841 may be provided. CPP 841 includes a computer readable medium (CRM) 842 storing a computer program (CP) 843 comprising computer readable instructions (CRI) 844. CRM 842 may be a non-transitory computer readable medium, such as, but not limited to magnetic media (e.g., a hard disk), optical media (e.g., a DVD), memory devices (e.g., random access memory), and the like. In some embodiments, the CRI 844 of computer program 843 is configured such that when executed by data processing system 802, the CRI causes UE 102 to perform steps described above (e.g., steps described above with reference to the flow charts). In other embodiments, UE 102 may be configured to perform steps described herein without the need for code. That is, for example, data processing system 802 may consist merely of one or more ASICs. Hence, the features of the embodiments described herein may be implemented in hardware and/or software.

Concise description of various disclosed embodiments

I. Mobile Originated (MO) Service Request Handling

A1. A method (400) performed by an AMF (104) for message handling (e.g., service request handling), comprising:

receiving (402) a first message (e.g., a service request) transmitted by a user equipment, UE (102), wherein the first message comprises information (e.g., a first bitmap) identifying: i) a first PDU session for which a UP is to be established and ii) a second PDU session for which a UP is to be established;

identifying (404) a first SMF that is associated with the first PDU session;

identifying (406) a second SMF that is associated with the second PDU session;

as a result of identifying (404) the first SMF, transmitting (408) to the first SMF a second message (e.g., an NG11 notification/request);

as a result of identifying (406) the second SMF, transmitting (410) to the second SMF a third message (e.g., an NG11 notification/request);

receiving (412) a response transmitted by the first SMF in response to the second message, wherein the response transmitted by the first SMF comprises a first session management (SM) container for an access node (108) serving the UE; and immediately after receiving the response transmitted by the first SMF, transmitting (414) to the access node a message comprising a) a mobility management (MM) container and b) the first SM container received from the first SMF.

A2. The method (400) of embodiment A1, further comprising:

after transmitting (414) the message to the access node, receiving (416) a response transmitted by the second SMF in response to the third message, wherein the response transmitted by the second SMF comprises a second session management (SM) container for the access node (108) serving the UE (102); and after receiving (416) the response transmitted by the second SMF, transmitting (418) to the access node (102) a message comprising the second SM container received from the second SMF.

A3. The method (400) of embodiment A1 or A2, wherein the first message further comprises PDU session status information (e.g., a second bitmap) that identifies, for each possible PDU session, the status of the PDU session.

A4. The method (400) of embodiment A3, further comprising:

retrieving previously stored PDU session status information for the UE (102);

determining whether the PDU session status formation contained in the first message matches the retrieved PDU status information for the UE (102).

A5. The method (400) of embodiment A4, further comprising:

in response to determining that the PDU session status formation contained in the first message does not match the retrieved PDU status information for the UE (102), transmitting to the UE (102) a PDU session status synchronization message (e.g., an NG1 message) to synchronize the PDU session status information.

A6. The method (400) of embodiment A1-A5, further comprising:

after transmitting to the access node the message comprising a) the mobility management (MM) container and b) the first SM container received from the first SMF, receiving a response transmitted by the access node (108), wherein the response transmitted by the access node (108) comprises radio access network (RAN) UP information for the first SMF.

A7. The method (400) of embodiment A6, further comprising:

forwarding the RAN UP information to the first SMF, wherein the RAN UP information enables the first SMF to communicate the RAN UP information to a UP function (UPF) for the first PDU session.

A8. The method (400) of any one of embodiments A2-A7, further comprising:

after transmitting to the access node (108) the message comprising the second SM container received from the second SMF, receiving a response transmitted by the access node (108), wherein the response transmitted by the access node (108) comprises radio access network (RAN) UP information for the second SMF.

A9. The method (400) of embodiment A8, further comprising:

forwarding the RAN UP information to the second SMF, wherein the RAN UP information enables the second SMF to communicate the RAN UP information to a UP function (UPF) for the second PDU session.

A10. The method (400) of any one of the above embodiments, wherein the information in the SR that identifiers the first and second PDU sessions for which a UP is to be established comprises a bitmap comprising at least a first bit corresponding to the first PDU session and a second bit corresponding to the second PDU session.

A11. The method (400) of any one of the above embodiments, wherein the first SM container comprises information indicating a first core network (CN) user plane (UP) tunnel and a first quality of service (QoS), and wherein the second SM container comprises information indicating a second CN UP tunnel and a second QoS.

B1. An AMF (104) for message handling (e.g., service request handling), the AMF (104) adapted to:

receive (402) a first message (e.g., a service request) transmitted by a user equipment, UE (102), wherein the first message comprises information (e.g., a first bitmap) identifying: i) a first PDU session for which a UP is to be established and ii) a second PDU session for which a UP is to be established;
identify (404) a first SMF that is associated with the first PDU session;
identify (406) a second SMF that is associated with the second PDU session;
as a result of identifying (404) the first SMF, transmit (408) to the first SMF a second message (e.g., an NG11 notification/request);
as a result of identifying (406) the second SMF, transmit (410) to the second SMF a third message (e.g., an NG11 notification/request);
receive (412) a response transmitted by the first SMF in response to the second message, wherein the response transmitted by the first SMF comprises a first session management (SM) container for an access node (108) serving the UE (102); and
immediately after receiving the response transmitted by the first SMF, transmit (414) to the access node (108) a message comprising a) a mobility management (MM) container and b) the first SM container received from the first SMF.

C1. An AMF (104) for message handling (e.g., service request handling), the AMF (104) comprising:
a first obtaining module (1002) configured to obtain via a receiver a first message (e.g., a service request) transmitted by a user equipment, UE (102), wherein the first message comprises information (e.g., a first bitmap) identifying: i) a first PDU session for which a UP is to be established and ii) a second PDU session for which a UP is to be established;
a first identifying module (1004) for identifying a first SMF that is associated with the first PDU session;
a second identifying module (1006) configured to identify a second SMF that is associated with the second PDU session;
a first transmitting module (1008) configured to employ a transmitter to transmit to the first SMF a second message (e.g., an NG11 notification/request) as a result of identifying the first SMF;
a second transmitting module (1010) configured to employ the transmitter to transmit to the second SMF a third message (e.g., an NG11 notification/request) as a result of identifying the second SMF;
a second obtaining module (1012) configured to obtain via the receiver a response transmitted by the first SMF in response to the second message, wherein the response transmitted by the first SMF comprises a first session management (SM) container for an access node (108) serving the UE (102); and
a third transmitting module (1014) configured to, immediately after obtaining the response transmitted by the first SMF, employ the transmitter to transmit to the access node (108) the third message comprising a) a mobility management (MM) container and b) the first SM container received from the first SMF.

B/C2a. The AMF (104) of embodiment B1, being further adapted to:
after transmitting (414) the message to the access node, receive (416) a response transmitted by the second SMF in response to the third message, wherein the response transmitted by the second SMF comprises a second session management (SM) container for the access node (108) serving the UE (102); and
after receiving (416) the response transmitted by the second SMF, transmit (418) to the access node (108) a message comprising the second SM container received from the second SMF.

B/C2b. The AMF (104) of embodiment C1, further comprising:
after employing the transmitter to transmit the message to the access node, a third obtaining module (1018) configured to obtain via the receiver a response transmitted by the second SMF in response to the third message, wherein the response transmitted by the second SMF comprises a second session management (SM) container for the access node (108) serving the UE (102); and
after obtaining via the receiver the response transmitted by the second SMF, a fourth transmitting module (1020) configured to employ the transmitter to transmit to the access node (108) a message comprising the second SM container received from the second SMF.

B/C3. The AMF (104) of any one of the above AMF embodiments, wherein the first message further comprises PDU session status information (e.g., a second bitmap) that identifies, for each possible PDU session, the status of the PDU session.

B/C4. The AMF (104) of embodiment B/C3, wherein the AMF (104) is further adapted to: retrieve previously stored PDU session status information for the UE (102); and determine whether the PDU session status formation contained in the first message matches the retrieved PDU status information for the UE (102);
or
the AMF (104) further comprises: a first retrieving module (1022) configured to retrieve previously stored PDU session status information for the UE (102); and a first determining module (1024) configured to determine whether the PDU session status formation contained in the first message matches the retrieved PDU status information for the UE (102).

B/C5. The AMF of embodiment B/C4, wherein
the AMF (104) is further adapted to transmit to the UE (102) a PDU session status synchronization message (e.g., an NG1 message) to synchronize the PDU session status information in response to determining that the PDU session status formation contained in the first message does not match the retrieved PDU status information for the UE (102);
or
the AMF (104) further comprises a fifth transmitting module (1028) configured to, in response to determining that the PDU session status formation contained in the first message does not match the retrieved PDU status information for the UE (102), employ the transmitter to transmit to the UE (102) a PDU session status synchronization message (e.g., an NG1 message) to synchronize the PDU session status information.

B/C6. The AMF (104) of any one of the above AMF embodiments, wherein the AMF (104) is further adapted to:
after transmitting to the access node the message comprising a) the mobility management (MM) container and b) the first SM container received from the first SMF, receive a response transmitted by the access node, wherein the response transmitted by the access node comprises radio access network (RAN) UP information for the first SMF.

B/C7. The AMF (104) of embodiment B/C6, wherein the AMF (104) is further adapted to:

forward the RAN UP information to the first SMF, wherein the RAN UP information enables the first SMF to communicate the RAN UP information to a UP function (UPF) for the first PDU session.

B/C8. The AMF (104) of any one of the above AMF embodiments, wherein the AMF (104) is further adapted to:

after transmitting to the access node (108) the message comprising the second SM container received from the second SMF, receive a response transmitted by the access node (108), wherein the response transmitted by the access node (108) comprises radio access network (RAN) UP information for the second SMF.

B/C9. The AMF (104) of embodiment B/C8, wherein the AMF (104) is further adapted to:

forward the RAN UP information to the second SMF, wherein the RAN UP information enables the second SMF to communicate the RAN UP information to a UP function (UPF) for the second PDU session.

B/C10. The AMF (104) of any one of the above AMF embodiments, wherein the information in the SR that identifiers the first and second PDU sessions for which a UP is to be established comprises a bitmap comprising at least a first bit corresponding to the first PDU session and a second bit corresponding to the second PDU session.

B/C11. The AMF (104) of any one of the above AMF embodiments, wherein the first SM container comprises information indicating a first core network (CN) user plane (UP) tunnel and a first quality of service (QoS), and wherein the second SM container comprises information indicating a second CN UP tunnel and a second QoS.

D1. A method (500) performed by an AMF (104) for message handling (e.g., service request handling), comprising:

receiving (502) a first message (e.g., a service request) transmitted by a user equipment, UE (102), wherein the first message comprises information (e.g., a first bitmap) identifying: i) a first PDU session for which a UP is to be established and ii) a second PDU session for which a UP is to be established;

identifying (504) a first SMF that is associated with the first PDU session;

identifying (506) a second SMF that is associated with the second PDU session;

as a result of identifying (504) the first SMF, transmitting (508) to the first SMF a second message (e.g., an NG11 notification/request);

as a result of identifying (506) the second SMF, transmitting (510) to the second SMF a third message (e.g., an NG11 notification/request);

setting (512) a timer;

receiving (514) a response transmitted by the first SMF in response to the second message, wherein the response transmitted by the first SMF comprises a first session management (SM) container for an access node (108) serving the UE (102); and when the timer expires, transmitting (520) to the access node (108) a message comprising a) a mobility management (MM) container and b) the first SM container received from the first SMF.

D2. The method (500) of embodiment D1, the method (500) further comprising:

prior to when the timer expires, receiving a response transmitted by the second SMF in response to the third message, wherein the response transmitted by the second SMF comprises a second session management (SM) container for the access node (108) serving the UE (102); and when the timer expires, transmitting to the access node (108) a message comprising a) a mobility management (MM) container, b) the first SM container received from the first SMF, and c) the second SM container received from the second SMF.

D3. The method (500) of embodiment D1 or D2, wherein the timer is set based on predetermined configurations and policies.

D4. The method (500) of any one of embodiments D1 to D3, wherein the timer is set based on a level of criticality of application and service in the first PDU session and the second PDU session.

D5. The method (500) of any one of embodiments D1-D4, wherein the first message further comprises PDU session status information (e.g., a second bitmap) that identifies, for each possible PDU session, the status of the PDU session.

D6. The method (500) of embodiment D5, further comprising:

retrieving previously stored PDU session status information for the UE (102);

determining whether the PDU session status formation contained in the first message matches the retrieved PDU status information for the UE (102).

D7. The method (500) of embodiment D6, further comprising:

in response to determining that the PDU session status formation contained in the first message does not match the retrieved PDU status information for the UE (102), transmitting to the UE (102) a PDU session status synchronization message (e.g., an NG1 message) to synchronize the PDU session status information.

D8. The method (500) of any one of the embodiments D1-D7, wherein the information in the SR that identifiers the first and second PDU sessions for which a UP is to be established comprises a bitmap comprising at least a first bit corresponding to the first PDU session and a second bit corresponding to the second PDU session.

E1. An AMF (104) for message handling (e.g., service request handling), the AMF (104) adapted to:

receive (502) a first message (e.g., a service request) transmitted by a user equipment, UE (102), wherein the first message comprises information (e.g., a first bitmap) identifying: i) a first PDU session for which a UP is to be established and ii) a second PDU session for which a UP is to be established;

identify (504) a first SMF that is associated with the first PDU session;

identify (506) a second SMF that is associated with the second PDU session;

as a result of identifying (504) the first SMF, transmit (508) to the first SMF a second message (e.g., an NG11 notification/request);

as a result of identifying (506) the second SMF, transmit (510) to the second SMF a third message (e.g., an NG11 notification/request);

set (512) a timer;

receive (514) a response transmitted by the first SMF in response to the second message, wherein the response transmitted by the first SMF comprises a first session management (SM) container for an access node (108) serving the UE (102); and when the timer expires, transmit (520) to the access node (108) a message comprising a) a mobility management (MM) container and b) the first SM container received from the first SMF.

F1. An AMF (104) for message handling (e.g., service request handling), the AMF (104) comprising:

a first obtaining module (1002) configured to obtain via a receiver a first message (e.g., a service request) transmitted by a user equipment, UE (102), wherein the first message comprises information (e.g., a first bitmap) identifying: i) a first PDU session for which a UP is to be established and ii) a second PDU session for which a UP is to be established;

a first identifying module (1004) configured to identify a first session managing function (SMF) that is associated with the first PDU session;

a second identifying module (1006) configured to identify a second SMF that is associated with the second PDU session;

a first transmitting module (1008) configured to employ a transmitter to transmit, as a result of identifying the first SMF, to the first SMF a second message (e.g., an NG11 notification/request);

a second transmitting module (1010) configured to employ a transmitter to transmit, as a result of identifying the second SMF, to the second SMF a third message (e.g., an NG11 notification/request);

a first setting module (1016) configured to set a timer;

a second obtaining module (1012) configured to obtain via the receiver a response transmitted by the first SMF in response to the second message, wherein the response transmitted by the first SMF comprises a first session management (SM) container for an access node (108) serving the UE (102); and a third transmitting module (1014) configured to employ a transmitter to transmit, when the timer expires, to the access node (108) a message comprising a) a mobility management (MM) container and b) the first SM container received from the first SMF.

E/F2. The AMF (104) of embodiment E1 or F1, the AMF (104) further adapted to:

prior to when the timer expires, receive a response transmitted by the second SMF in response to the third message, wherein the response transmitted by the second SMF comprises a second session management (SM) container for the access node (108) serving the UE (102); and when the timer expires, transmit to the access node (108) a message comprising a) a mobility management (MM) container, b) the first SM container received from the first SMF, and c) the second SM container received from the second SMF.

E/F3. The AMF (104) of embodiments E1-E2 or F1-F2, wherein the timer is set based on predetermined configurations and policies.

E/F4. The AMF (104) of embodiments E1-E2 or F1-F2, wherein the timer is set based on a level of criticality of application and service in the first PDU session and the second PDU session.

II. Mobile Terminated (MT) Service Request

G1. A method (600) performed by an AMF (104) for message handling (e.g., service request handling), comprising:

receiving (602) a first message (e.g., an NG11 request) transmitted by a SMF in response to the SMF receiving a notification that DL data for a user equipment, UE (102), has been received, wherein the UE (102) has at least one PDU session, the DL data is associated with a particular one of the UE's (102) PDU sessions, and the first message comprises information indicating a request to setup a UP; and in response to receiving (602) the first message, transmitting (108) via an access node (108) a paging message to the UE (102), wherein the paging message comprises information indicating said particular one of the UE's (102) PDU sessions.

H1. An AMF (104) for message handling (e.g., service request handling), the AMF (104) adapted to:

receive (602) a first message (e.g., an NG11 request) transmitted by a session managing function (SMF) in response to the SMF receiving a notification that downlink (DL) data for a user equipment, UE (102), has been received, wherein the UE (102) has at least one PDU session, the DL data is associated with a particular one of the UE's (102) PDU sessions, and the first message comprises information indicating a request to setup a user plane (UP); and in response to receiving (602) the first message, transmit (604) via an access node (108) a paging message to the UE (102), wherein the paging message comprises information indicating said particular one of the UE's (102) PDU sessions.

I1. An AMF (104) for message handling (e.g., service request handling), the AMF (104) comprising:

a first obtaining module (1002) configured to obtain via receiver a first message (e.g., an NG11 request) transmitted by a session managing function (SMF) in response to the SMF receiving a notification that downlink (DL) data for a user equipment, UE (102), has been received, wherein the UE (102) has at least one PDU session, the DL data is associated with a particular one of the UE's (102) PDU sessions, and the first message comprises information indicating a request to setup a user plane (UP); and a first transmitting module (1008) configured to employ a transmitter to transmit, in response to obtaining the first message, via an access node (108) a paging message to the UE (102), wherein the paging message comprises information indicating said particular one of the UE's (102) PDU sessions.

J1. A method (1100) performed by an AMF (104) for message handling (e.g., service request handling), comprising:

receiving (1102) a first message (e.g., an NG11 request) transmitted by an SMF in response to the SMF receiving a notification that DL data for a user equipment, UE (102), has been received, wherein the UE (102) has at least one PDU session, the DL data is associated with a particular one of the UE's (102) PDU sessions, and the first message comprises information indicating a request to setup a UP; and in response to receiving (1102) the first message:

storing (1104) a record comprising: i) an SMF identifier for identifying the SMF and ii) a PDU session identifier for identifying the particular PDU session, wherein the record is mapped to a UE identifier for identifying the UE (102); and transmitting (1106) via an access node (108) a paging message to the UE (102), wherein the paging message does not include information indicating said particular one of the UE's (102) PDU sessions.

J2. The method (1100) of embodiment J1, further comprising:

receiving an SR transmitted by the UE (102); and in response to receiving the SR:
  using the UE identifier to retrieve the stored SMF identifier and PDU session identifier; and
  after retrieving the identifiers, transmitting to the SMF identified by the SMF identifier a message (e.g., an NG11 message comprising the PDU session identifier).

K1. An AMF (104) being adapted to:
  receive (1102) a first message (e.g., an NG11 request) transmitted by an SMF in response to the SMF receiving a notification that DL data for a user equipment, UE (102), has been received, wherein the UE (102) has at least one PDU session, the DL data is associated with a particular one of the UE's (102) PDU sessions, and the first message comprises information indicating a request to setup a UP; and
  in response to receiving (1102) the first message:
  store (1104) a record comprising: i) an SMF identifier for identifying the SMF and ii) a PDU session identifier for identifying the particular PDU session, wherein the record is mapped to a UE identifier for identifying the UE (102); and
  transmit (1106) via an access node (108) a paging message to the UE (102), wherein the paging message does not include information indicating said particular one of the UE's (102) PDU sessions.

K2. The AMF (104) of embodiment K1, wherein the AMF (104) is further adapted to:
  receive an SR transmitted by the UE (102); and
  in response to receiving the SR:
  use the UE identifier to retrieve the stored SMF identifier and PDU session identifier; and
  after retrieving the identifiers, transmit to the SMF identified by the SMF identifier a message (e.g., an NG11 message comprising the PDU session identifier).

L1. An AMF (104) comprising:
  a first obtaining module (1002) configured to obtain via a receiver a first message (e.g., an NG11 request) transmitted by an SMF in response to the SMF receiving a notification that DL data for a UE (102) has been received, wherein the UE (102) has at least one PDU session, the DL data is associated with a particular one of the UE's (102) PDU sessions, and the first message comprises information indicating a request to setup a UP; and
  in response to obtaining the first message:
  a first storing module (1026) configured to store a record comprising: i) an SMF identifier for identifying the SMF and ii) a PDU session identifier for identifying the particular PDU session, wherein the record is mapped to a UE identifier for identifying the UE; and
  a first transmitting module (1008) configured to employ a transmitter to transmit via an access node (108) a paging message to the UE (102), wherein the paging message does not include information indicating said particular one of the UE's (102) PDU sessions.

L2. The AMF (104) of embodiment L1, further comprising:
  a second obtaining module (1012) configured to obtain via the receiver an SR transmitted by the UE (102); and
  in response to obtaining the SR:
  a first retrieving module (1022) configured to retrieve the stored SMF identifier and PDU session identifier using the UE identifier; and
  a second transmitting module (1010) configured to employ the transmitter to transmit to the SMF identified by the SMF identifier a message (e.g., an NG11 message comprising the PDU session identifier) after retrieving the identifiers.

III. UE Embodiments

Figure 9:
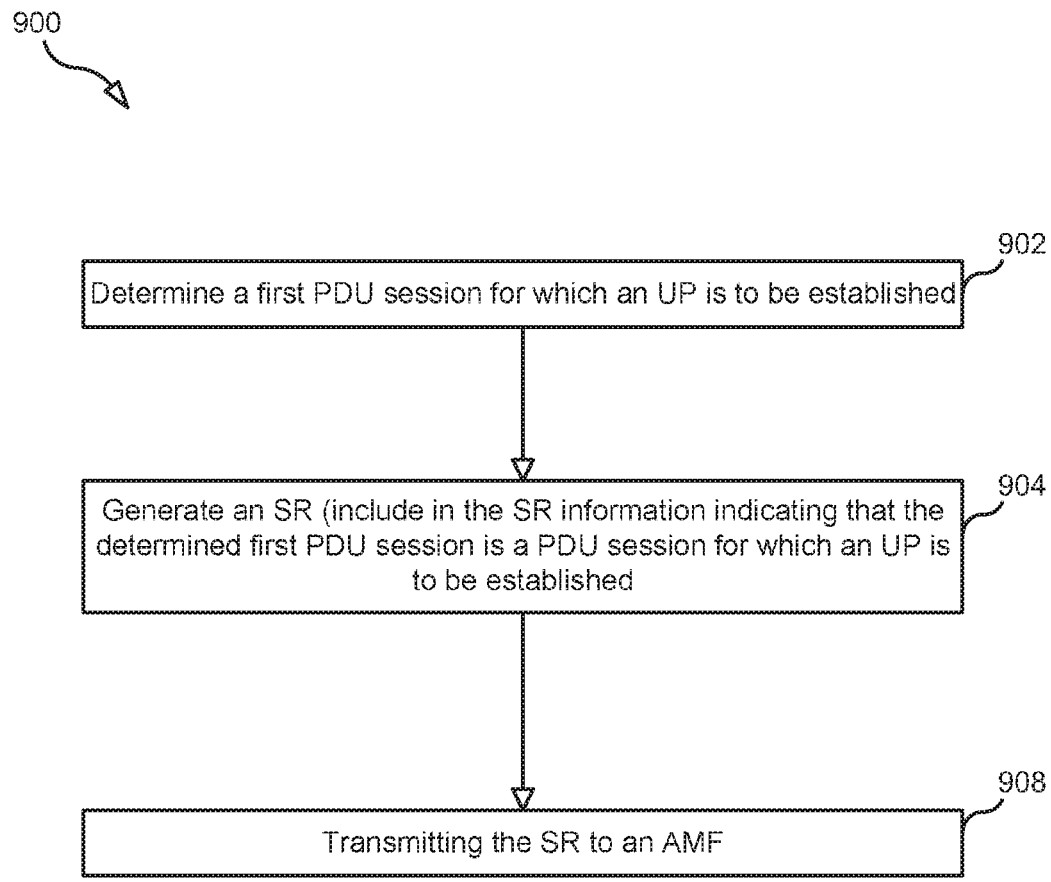
FIG. 9 is a flow chart illustrating a process according to one embodiment.
Figure 10:
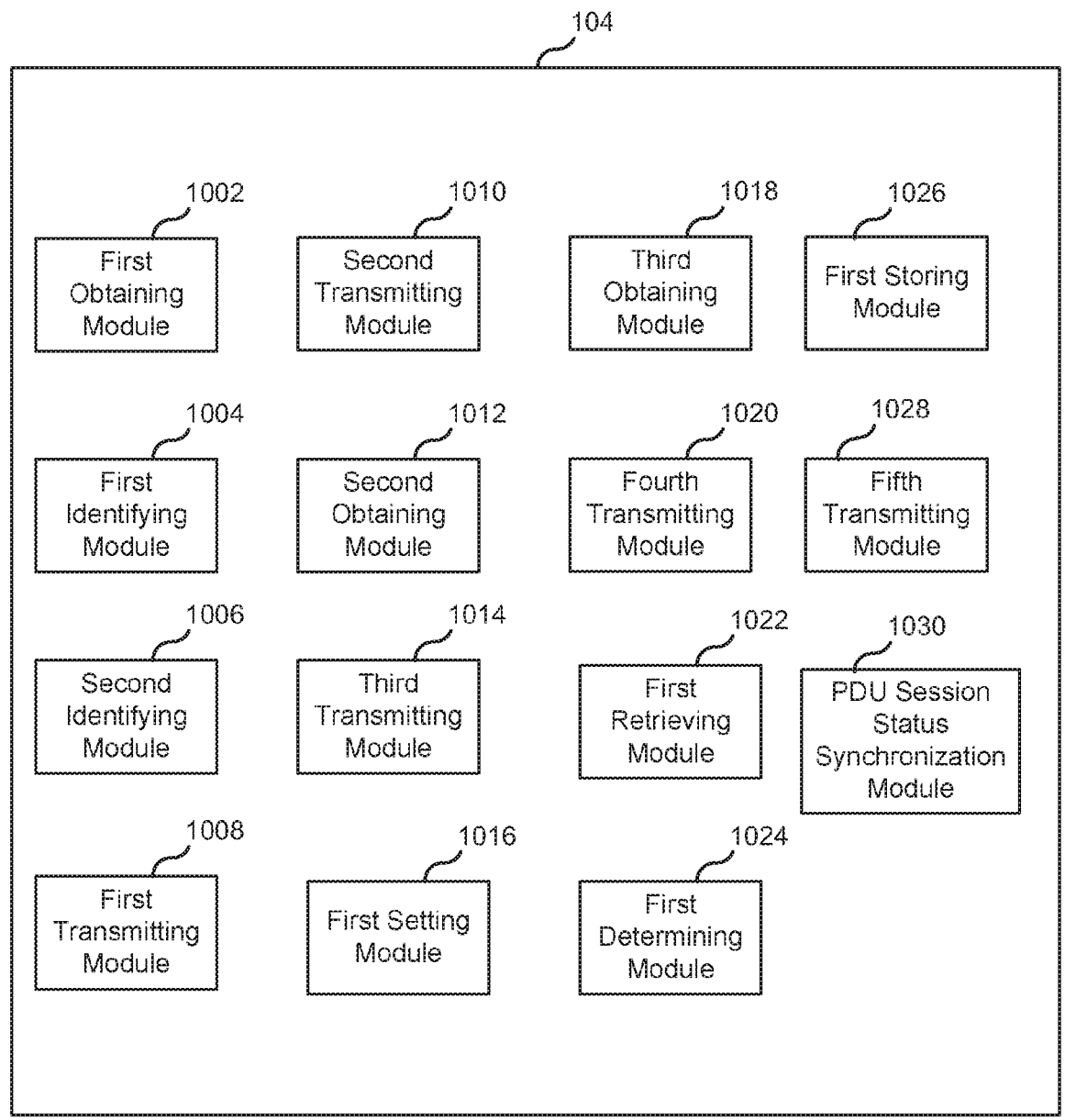
FIG. 10 is a diagram showing functional modules of an AMF according to some embodiments.
Figure 11:
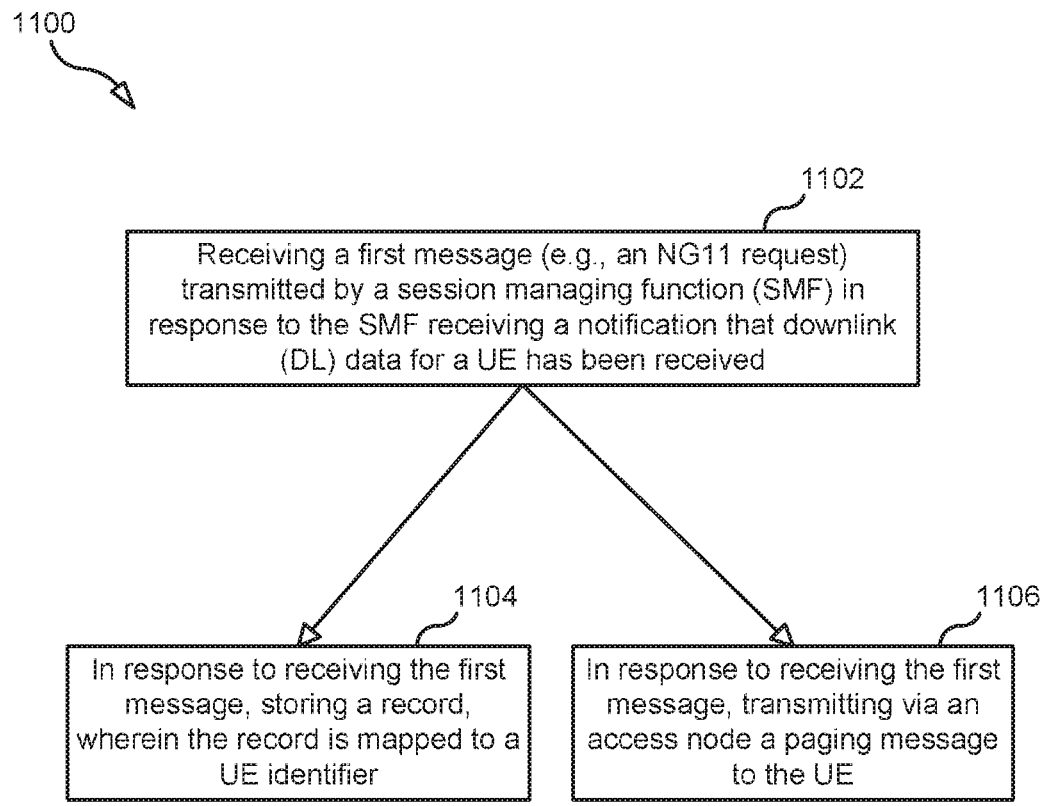
FIG. 11 is a flow chart illustrating a process according to one embodiment.
Figure 12:
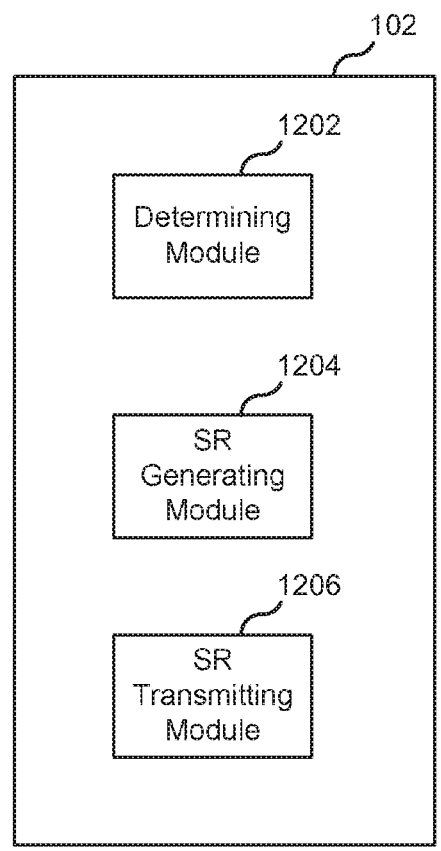
FIG. 12 is a diagram showing functional modules of a UE according to some embodiments.
Figure 13:
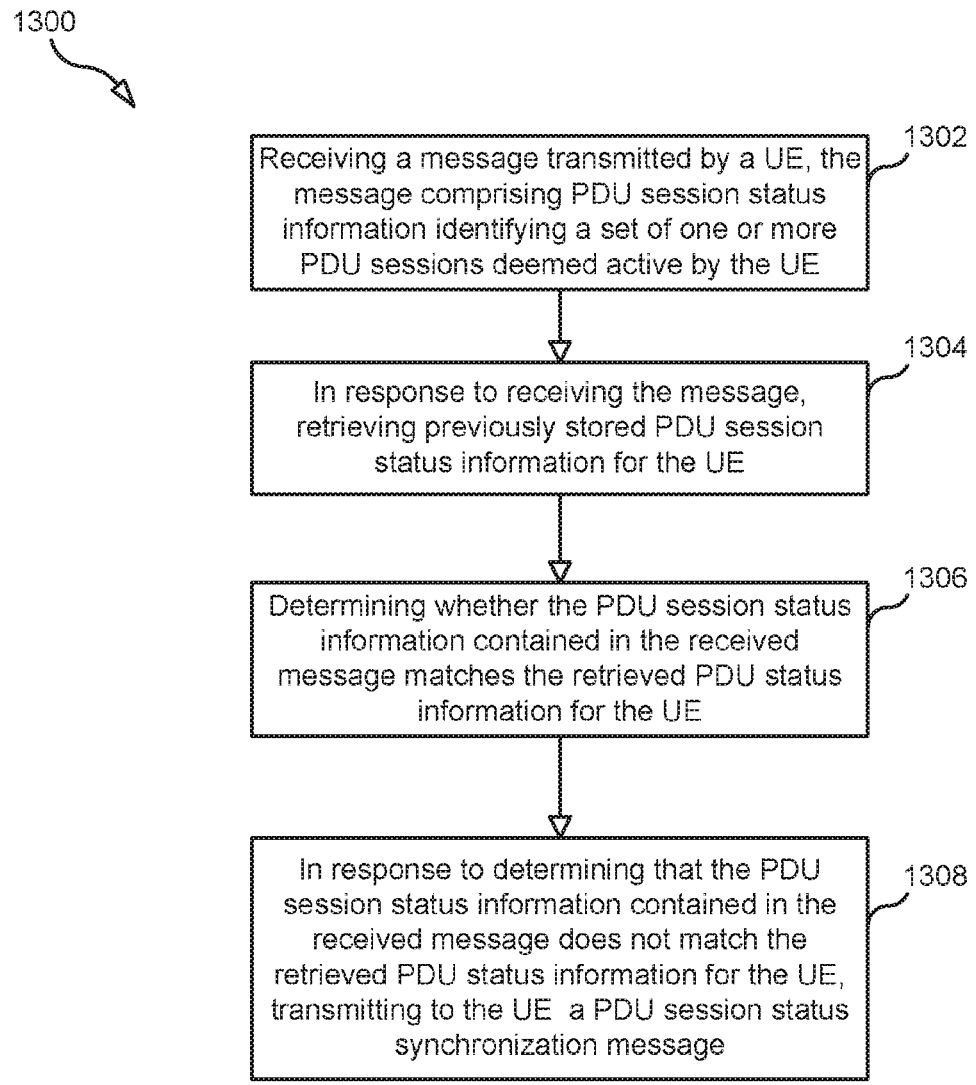
FIG. 13 is a flow chart illustrating a process according to one embodiment.
Figure 14:
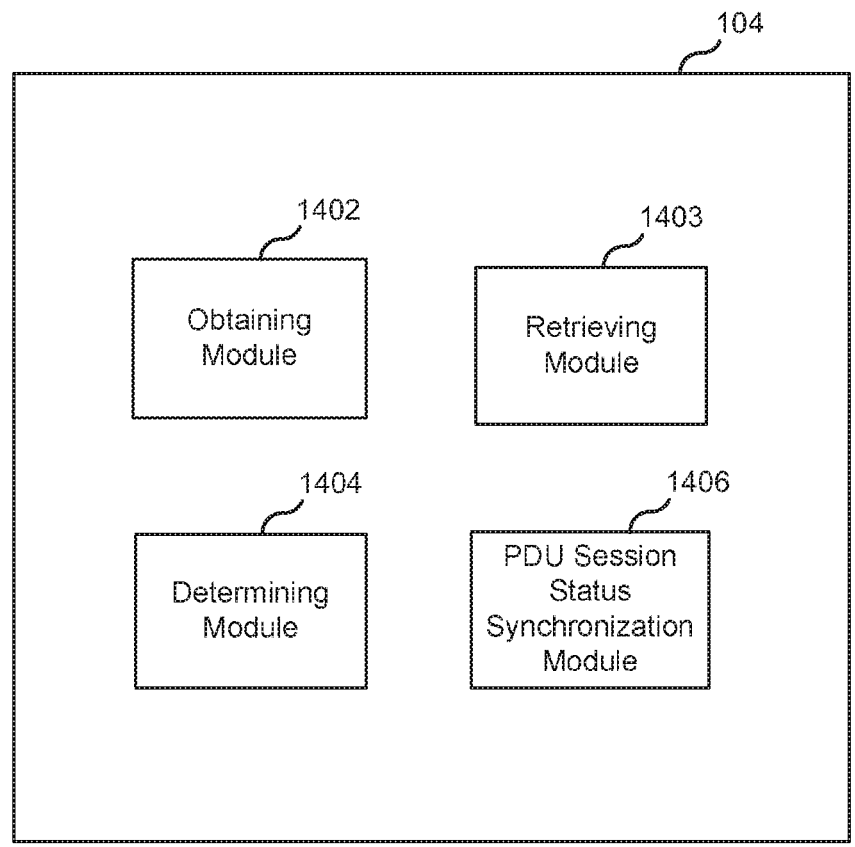
FIG. 14 is a diagram showing functional modules of an AMF according to some embodiments.

M1. A method (900, see FIG. 9) performed by a user equipment, UE (102), comprising:
  determining (902) a first PDU session for which a UP is to be established;
  generating (904) an SR; and
  transmitting (906) the SR to an AMF, wherein
  generating the SR comprises including in the SR information indicating that the determined first PDU session is a PDU session for which a UP is to be established.

M2. The method (900) of embodiment M1, wherein determining the PDU session for which the UP is to be established comprises: receiving a paging message comprising PDU session identification information for identifying the first PDU session and obtaining from the paging message the PDU session identification information.

M3. The method (900) of embodiment M2, further comprising:
  determining a second PDU session for which a UP is to be established, wherein
  generating the SR further comprises including in the SR information indicating that the determined second PDU session is a PDU session for which a UP is to be established.

M4. The method (900) of embodiment M3, wherein determining the second PDU session comprises determining a PDU session for which the UE (102) has UL UP data to send to a recipient.

M5. The method (900) of embodiment M1, wherein determining the first PDU session comprises determining a PDU session for which the UE (102) has UL UP data to send to a recipient.

M6. The method (900) of embodiment M5, wherein including in the SR information indicating that the determined first PDU session is a PDU session for which a UP is to be established comprises including a bitmap in the SR, wherein one of the bits of the bitmap corresponds to the first PDU session and said bit corresponding to the first PDU session is set to a value of 1.

N1. A user equipment (102), UE, the UE (102) being adapted to:
  determine a first PDU session for which a UP is to be established;
  generate an SR; and
  transmit the SR to an AMF, wherein
  the UE is adapted to generate the SR by performing a process comprising including in the SR information indicating that the determined first PDU session is a PDU session for which a UP is to be established.

O1. A user equipment (102), UE, the UE (102) comprising:
  a determining module (1202) for determining a first PDU session for which a UP is to be established;
  an SR generating module (1204) for generating an SR; and
  an SR transmitting module (1206) for employing a transmitter to transmit the SR to an AMF, wherein
  the SR generating module is configured to generate the SR by performing a process comprising including in the SR information indicating that the determined first PDU session is a PDU session for which a UP is to be established.

IV. PDU session status synchronization

P1. A method (1300) for PDU session synchronization, comprising:
receiving (1302) a message transmitted by a UE (102), the message comprising PDU session status information (e.g., a bitmap) identifying a set of one or more PDU sessions deemed active by the UE;
in response to receiving the message, retrieving (1304) previously stored PDU session status information for the UE;
determining (1306) whether the PDU session status formation contained in the received message matches the retrieved PDU status information for the UE; and
in response to determining that the PDU session status formation contained in the received message does not match the retrieved PDU status information for the UE, transmitting (1308) to the UE a PDU session status synchronization message (e.g., an NG1 message) to synchronize the PDU session status information.

P2. The method of embodiment P1, wherein the PDU session status synchronization message comprises the previously stored PDU session status information for the UE.

P3. The method of embodiment P1 or P2, wherein the PDU session status synchronization message comprises information instructing the UE to deactivate a PDU session that is included in the set of PDU session deemed active by the UE.

Q1. An AMF (104) for PDU session synchronization, the AMF being adapted to:
receive a message transmitted by a UE (102), the message comprising PDU session status information (e.g., a bitmap) identifying a set of one or more PDU sessions deemed active by the UE;
retrieve previously stored PDU session status information for the UE in response to receiving the message;
determine whether the PDU session status formation contained in the received message matches the retrieved PDU status information for the UE; and
transmit to the UE a PDU session status synchronization message (e.g., an NG1 message) to synchronize the PDU session status information in response to determining that the PDU session status formation contained in the received message does not match the retrieved PDU status information for the UE.

R1. An AMF (104) for PDU session synchronization, the AMF comprising:
an obtaining module (1402) for obtaining PDU session status information (e.g., a bitmap) transmitted by a UE (102), the PDU status information identifying a set of one or more PDU sessions deemed active by the UE;
a retrieving module (1403) adapted to retrieve previously stored PDU session status information for the UE in response to receiving the message;
a determining module (1404) adapted to determine whether the PDU session status formation contained in the received message matches the retrieved PDU status information for the UE; and
a PDU session status synchronization module (1406) adapted to employ a transmitter to transmit to the UE a PDU session status synchronization message (e.g., an NG1 message) in response to determining that the PDU session status formation transmitted by the UE does not match the retrieved PDU status information for the UE.

While various embodiments of the present disclosure are described herein, it should be understood that they have been presented by way of example only, and not limitation. Thus, the breadth and scope of the present disclosure should not be limited by any of the above-described exemplary embodiments. Moreover, any combination of the above-described elements in all possible variations thereof is encompassed by the disclosure unless otherwise indicated herein or otherwise clearly contradicted by context.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

ABBREVIATIONS

AMF Access and Mobility Management function
CN Core Network
DL DownLink
MM mobility management
PDU Protocol Data Unit
QoS Quality of Service
RAN Radio Access Network
SM Session management
SMF Session Management function
SR Service Request
UE User Equipment,
UP User Plane
UPF User Plane Function

The invention claimed is:

1. A method performed by an, Access and Mobility Management function (AMF) for message handling comprising:
receiving a Non-Access Stratum, NAS, Service Request message transmitted by a user equipment (UE), wherein the NAS Service Request comprises information identifying multiple Packet Data Unit (PDU) sessions for which User Plane (UP) is to be established;
identifying multiple Session Management Functions, SMFs associated with the multiple PDU sessions;
transmitting to each of the multiple SMFs a Next Generation 11 (NG11) request message to establish the UP for the associated PDU session;
upon receiving a first NG11 response message to one of the NG11 request message from one SMF of the multiple SMFs, wherein the first NG11 response message comprises a first session management (SM) container, transmitting the first SM container to an access node serving the UE without further waiting for other NG11 response messages from other SMFs of the multiple SMFs; and
transmitting a NAS Service Response message in response to the NAS Service Request message for the UE upon receiving an NG11 response message from all of the multiple SMFs.

2. The method of claim 1, further comprising upon receiving a subsequent NG11 response message to another one of the NG11 request message from another SMF of the multiple SMFs, wherein the subsequent NG11 response message comprises another SM container, transmitting the other SM container to the access node serving the UE.

3. The method of claim 1, wherein the NAS Service Request further comprises PDU session status information that identifies, for each possible PDU session, the status of the PDU session.

4. The method of claim 3, further comprising:
retrieving previously stored PDU session status information for the UE;

determining whether the PDU session status formation contained in the NAS Service Request matches the retrieved PDU status information for the UE.

5. The method of claim 4, further comprising:
in response to determining that the PDU session status information contained in the NAS Service Request message does not match the retrieved PDU status information for the UE, transmitting to the UE a PDU session status synchronization message indicating the retrieved PDU status information to the UE.

6. The method of claim 4, further comprising:
in response to determining that the PDU session status information contained in the NAS Service Request message does not match the retrieved PDU status information for the UE, transmitting to the UE a PDU session status synchronization message instructing the UE to deactivate a PDU session that is included in the set of PDU sessions for which a UP is to be established.

7. The method of claim 2, wherein
the PDU session status information in the Service Request, SR, that identifies the multiple PDU sessions for which a UP is to be established comprises a bitmap wherein each bit corresponds to each PDU session of the multiple PDU sessions.

8. An Access and Mobility Management function (AMF) for message handling, the AMF adapted to:
receive a Non-Access Stratum (NAS) Service Request message transmitted by a user equipment (UE), wherein the NAS Service Request comprises information identifying multiple Packet Data Unit, PDU, sessions for which User Plane (UP) is to be established;
identify multiple Session Management Functions (SMFs) associated with the multiple PDU sessions;
transmit to each of the multiple SMFs a Next Generation 11, NG11, request message to establish the UP for the associated PDU session;
upon receiving a first NG11 response message to one of the NG11 request message from one SMF of the multiple SMFs, wherein the first NG11 response message comprises a first session management (SM) container, transmit the first SM container to an access node serving the UE without further waiting for other NG11 response messages from other SMFs of the multiple SMFs; and
transmit a NAS Service Response message in response to the NAS Service Request message for the UE upon receiving an NG11 response message from all of the multiple SMFs.

9. The Access and Mobility Management function (AMF) of claim 8, wherein the AMF is further adapted to:
upon receiving a subsequent NG11 response message to another one of the NG11 request message from another SMF of the multiple SMFs, wherein the subsequent NG11 response message comprises another SM container, transmitting the other SM container to the access node serving the UE.

10. The Access and Mobility Management function (AMF) of claim 8, wherein the NAS Service Request further comprises PDU session status information that identifies, for each possible PDU session, the status of the PDU session.

11. The Access and Mobility Management function (AMF) of claim 10, wherein the AMF is further adapted to:
retrieve previously stored PDU session status information for the UE; and
determine whether the PDU session status formation contained in the NAS Service Request matches the retrieved PDU status information for the UE.

12. The Access and Mobility Management function (AMF) of claim 11, wherein the AMF is further adapted to:
in response to determining that the PDU session status information contained in the NAS Service Request message does not match the retrieved PDU status information for the UE, transmit to the UE a PDU session status synchronization message indicating the retrieved PDU status information to the UE.

13. The Access and Mobility Management function (AMF) of claim 11, wherein the AMF is further adapted to:
in response to determining that the PDU session status information contained in the NAS Service Request message does not match the retrieved PDU status information for the UE, transmit to the UE a PDU session status synchronization message instructing the UE to deactivate a PDU session that is included in the set of PDU sessions for which a UP is to be established.

14. The Access and Mobility Management function (AMF) of claim 9, wherein the PDU session status information in the Service Request, SR, that identifies the multiple PDU sessions for which a UP is to be established comprises a bitmap wherein each bit corresponds to each PDU session of the multiple PDU sessions.

* * * * *

UNITED STATES PATENT AND TRADEMARK OFFICE
CERTIFICATE OF CORRECTION

PATENT NO. : 11,229,074 B2
APPLICATION NO. : 16/319039
DATED : January 18, 2022
INVENTOR(S) : Ramle et al.

It is certified that error appears in the above-identified patent and that said Letters Patent is hereby corrected as shown below:

In the Claims

In Column 22, Line 36, in Claim 1, delete "Packet" and insert -- Protocol --, therefor.

In Column 23, Line 31, in Claim 8, delete "Packet" and insert -- Protocol --, therefor.

Signed and Sealed this
Thirtieth Day of August, 2022

Katherine Kelly Vidal
*Director of the United States Patent and Trademark Office*